United States Patent
Chandan et al.

(10) Patent No.: US 6,779,930 B1
(45) Date of Patent: Aug. 24, 2004

(54) SYSTEMS AND METHODS FOR IMPROVING REPRODUCIBILITY OF SPLICE LOSS REDUCTION IN A PRE-SPLICE HEAT TREATMENT

(75) Inventors: Harish C. Chandan, Snellville, GA (US); Jian Luo, Duluth, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/366,940

(22) Filed: Feb. 14, 2003

(51) Int. Cl.[7] .............................. G02B 6/32; G02B 6/255
(52) U.S. Cl. .......................................... 385/96; 385/43
(58) Field of Search .............................. 385/95–99, 33, 385/43, 34

(56) References Cited

U.S. PATENT DOCUMENTS

2002/0114594 A1 * 8/2002 Kato et al. ..................... 385/96
2002/0136490 A1 * 9/2002 Zhang et al. .................. 385/33
2003/0133654 A1 * 7/2003 Chang .......................... 385/34

* cited by examiner

Primary Examiner—Hemang Sanghavi
(74) Attorney, Agent, or Firm—Priest & Goldstein, PLLC

(57) ABSTRACT

Systems and techniques are described for improving reproducibility in a pre-splice heat treatment. A heat treatment station is described for applying a pre-splice beat treatment to a lead end of a first optical fiber having a first modefield diameter. The heat treatment station comprises a base, and a fiber clamp for holding the first optical fiber such that a length of the lead end of the first optical fiber is positioned over a heat source mounted to the base. The heat source causes a controlled expansion of the first fiber modefield at the first fiber lead end to form an internal bridge. The heat treatment station further includes position adjustment means for adjusting the length of the first fiber lead end that is exposed to the heat source.

15 Claims, 11 Drawing Sheets

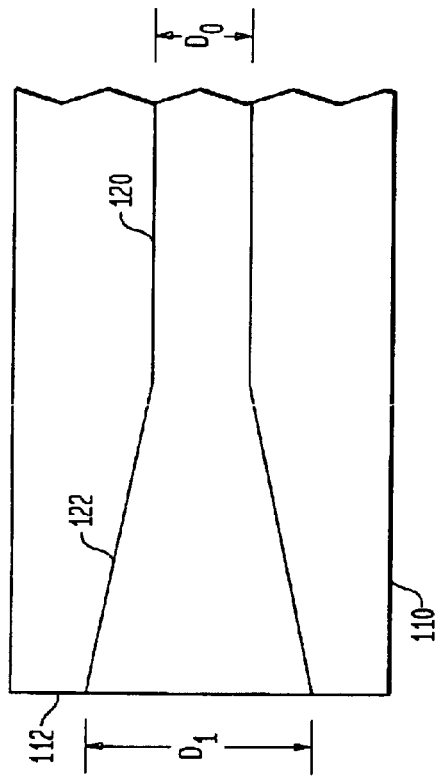
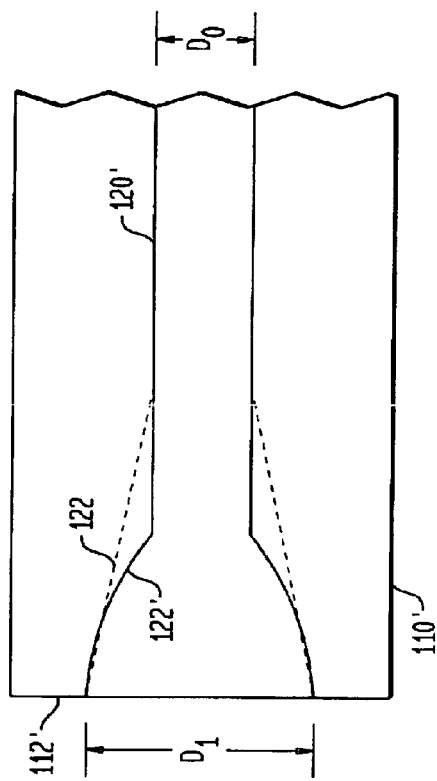
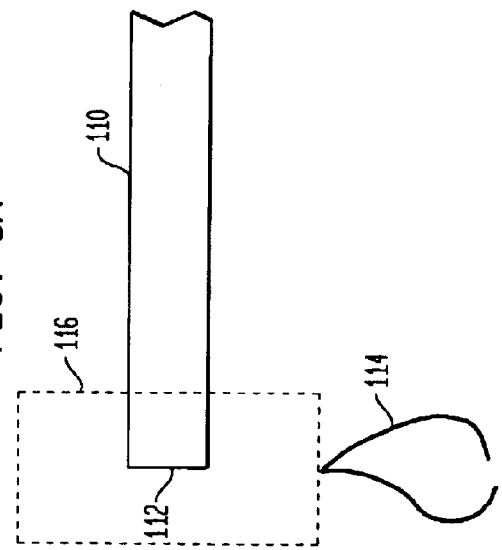
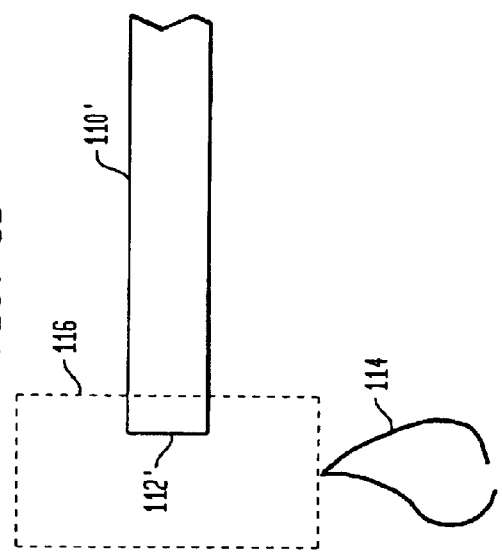

SYSTEMS AND METHODS FOR IMPROVING REPRODUCIBILITY OF SPLICE LOSS REDUCTION IN A PRE-SPLICE HEAT TREATMENT

BACKGROUND OF THE INVENTION

1. Field of the Invention

The present invention relates generally to improvements in the field of fiber optics, and particularly to advantageous aspects of systems and methods for improving reproducibility of splice loss reduction in a pre-splice heat treatment.

2. Description of Prior Art

There is a continuing effort in the optical fiber industry to find ways to reduce optical signal loss when a first type of optical fiber is spliced to a second type of optical fiber. Splice loss may arise for a number of different reasons. For example, if the first fiber has a modefield diameter that is significantly larger or smaller than the modefield diameter of the second fiber, splicing the two fibers together results in a modefield diameter mismatch at the splice point that results in splice loss.

One approach that has been developed to reduce splice loss resulting from modefield diameter mismatch is to use a thermal treatment to cause a diffusion of the dopants in the narrower modefield fiber in the region of the splice. This dopant diffusion causes an expansion of the fiber modefield in the splice region, thereby reducing modefield diameter mismatch. Thermal treatments are described, for example, in Krause, John T. et al., "Splice Loss of Single-Mode Fiber as Related to Fusion Time, Temperature, and Index Profile Alteration," Journal of Lightwave Technology, vol. LT-4, No. 7, 1986, pp.837–40; Tam, H. Y., "Simple Fusion Splicing Technique for Reducing Splicing Loss between Standard Singlemode Fibres and Erbium-Doped Fibre," Electronics Letters, vol. 27, No. 17, 1991, pp. 1597–99; and Ando, Yasuhiro, "Low-Loss Optical Connector between Dissimilar Single-Mode Fibers Using Local Core Expansion Technique by Thermal Diffusion," IEEE Photonics Technology Letters, vol. 4, No. 8, 1992, pp. 1028–31.

Recently, efforts have been made to develop a thermal treatment that is applied prior to splicing. In one such treatment, the lead end of a fiber having a narrower modefield diameter is loaded into a heat treatment station to cause an expansion of the modefield in preparation for splicing to a fiber having a larger modefield diameter. However, it has proven difficult to achieve consistent results using a pre-splice heat treatment technique.

SUMMARY OF INVENTION

An aspect of the invention provides a heat treatment station for applying a pre-splice heat treatment to a lead end of a first optical fiber having a first modefield diameter. The heat treatment station comprises a base, and a fiber clamp for holding the first optical fiber such that a length of the lead end of the first optical fiber is positioned over a heat source mounted to the base. The heat source causes a controlled expansion of the first fiber modefield at the first fiber lead end to form an internal bridge. The heat treatment station further includes length adjustment means for adjusting the length of the first fiber lead end positioned over the heat source.

Additional features and advantages of the present invention will become apparent by reference to the following detailed description and accompanying drawings.

BRIEF DESCRIPTION OF DRAWINGS

FIGS. 9A and 9B are diagrams illustrating different relative positions of a fiber lead end and a heat source in a pre-splice heat treatment station.

FIGS. 10A and 10B are diagrams illustrating results obtained using the different fiber lead end and heat source positions shown in FIGS. 9A and 9B.

DETAILED DESCRIPTION

Figure 2:
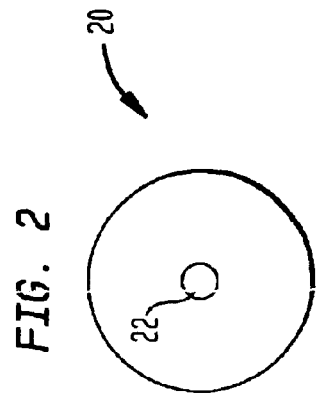
FIGS. 1 and 2 show cross sections of exemplary first and second fibers having different modefield diameters.
Figure 1:
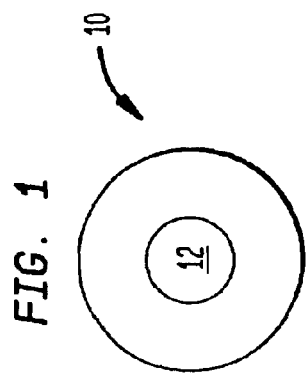

FIG. 1 shows a cross section of an exemplary first optical fiber 10, not drawn to scale. The fiber 10 is fabricated from silica ($SiO_2$) that has been doped to create a number of separate regions having different refractive indices that together form an optical pathway, or "modefield" 12, running down the length of the optical fiber 10. In this example, the modefield 12 is cylindrical in shape. FIG. 2 shows a cross section of a second exemplary optical fiber 20, not drawn to scale. The second fiber 20 also includes a cylindrical modefield 22 running down its length. As shown in FIGS. 1 and 2, the first fiber modefield diameter (MFD) is substantially larger than the second fiber modefield diameter. As used herein, in describing a pair of fibers having different modefield diameters, the fiber having the larger modefield diameter, such as first fiber 10, is generally referred to as a "larger modefield fiber." The fiber having the smaller modefield diameter, such as second fiber 20, is generally referred to as a "smaller modefield fiber." A larger modefield fiber may be, for example, a Standard Single Mode Fiber (SSME) or a Super Large Area Fiber (SLA). The smaller modefield fiber may be, for example, a Dispersion Compensating Fiber (DCF) or an Inverse Dispersion Fiber (IDF). It should be noted, however, that the present invention may be applied to other splice combinations involving other types of optical fibers.

Figure 3:
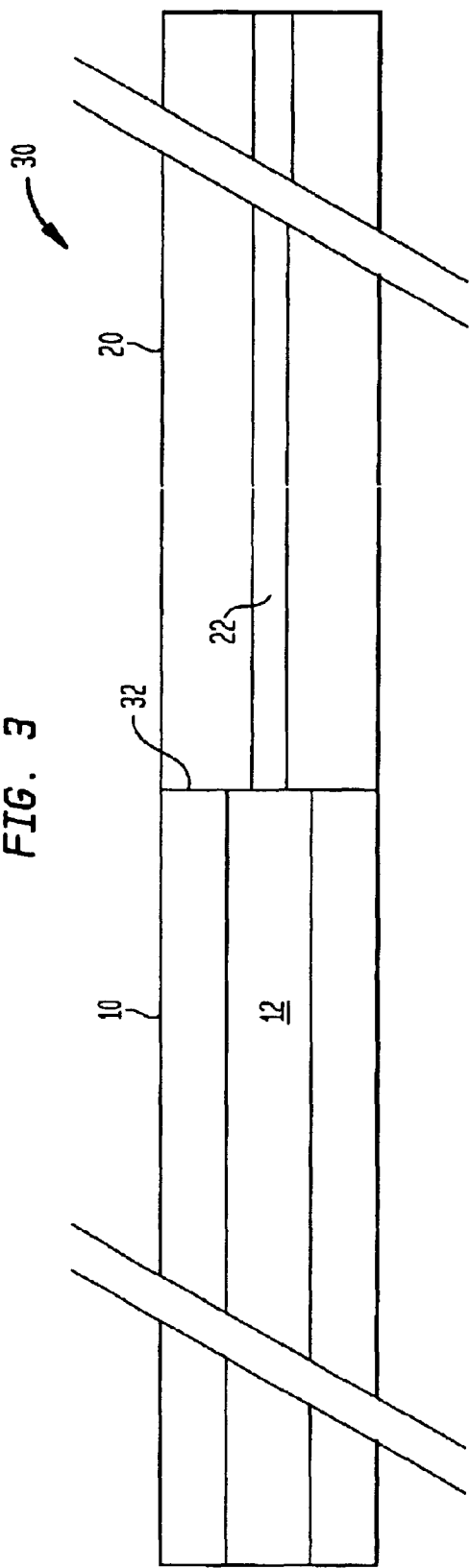
FIG. 3 shows a diagram of an optical fiber transmission line fabricated from the fibers shown in FIGS. 1 and 2.

FIG. 3 shows a diagram of an exemplary optical transmission line 30, formed by splicing lengths of the first and second fibers 10 and 20, shown in FIGS. 1 and 2, at a splice point 32. FIG. 3 illustrates the mismatch in diameter between the two modefields 12 and 22 at the splice point 32. This mismatch typically results in a significant amount of splice loss.

One technique that has been developed for reducing splice loss resulting from a modefield diameter mismatch is to create a low-loss transition between the smaller diameter modefield and the larger diameter modefield. For example, splice loss may be reduced by splicing a third fiber, called a "bridge fiber," between the first and second fibers. The bridge fiber has an intermediate modefield diameter that is in between the modefield diameters of the larger and smaller modefield fibers. Although there is some splice loss between the larger modefield fiber and the bridge fiber, and between the bridge fiber and the smaller modefield fiber, the sum of these splice losses is less than the splice loss that results when the first fiber is spliced directly to the second fiber.

In another approach, in which a bridge fiber is not used, a low-loss transition region is created by shaping a region of the modefield of the smaller modefield fiber in the vicinity of the splice. This region of the modefield is shaped to create a tapered transition from the smaller modefield diameter to a diameter at the splice point that matches the modefield diameter of the larger modefield fiber. As used herein, the shaped region of the modefield of the smaller modefield fiber is referred to as an "internal bridge."

An internal bridge may be created in a fiber by applying heat to the fiber to cause a diffusion of dopants within the fiber. The diffusion of dopants causes an expansion of the fiber's modefield. The amount of modefield expansion can be controlled to produce a transition region having the desired tapered shape.

Figure 4:
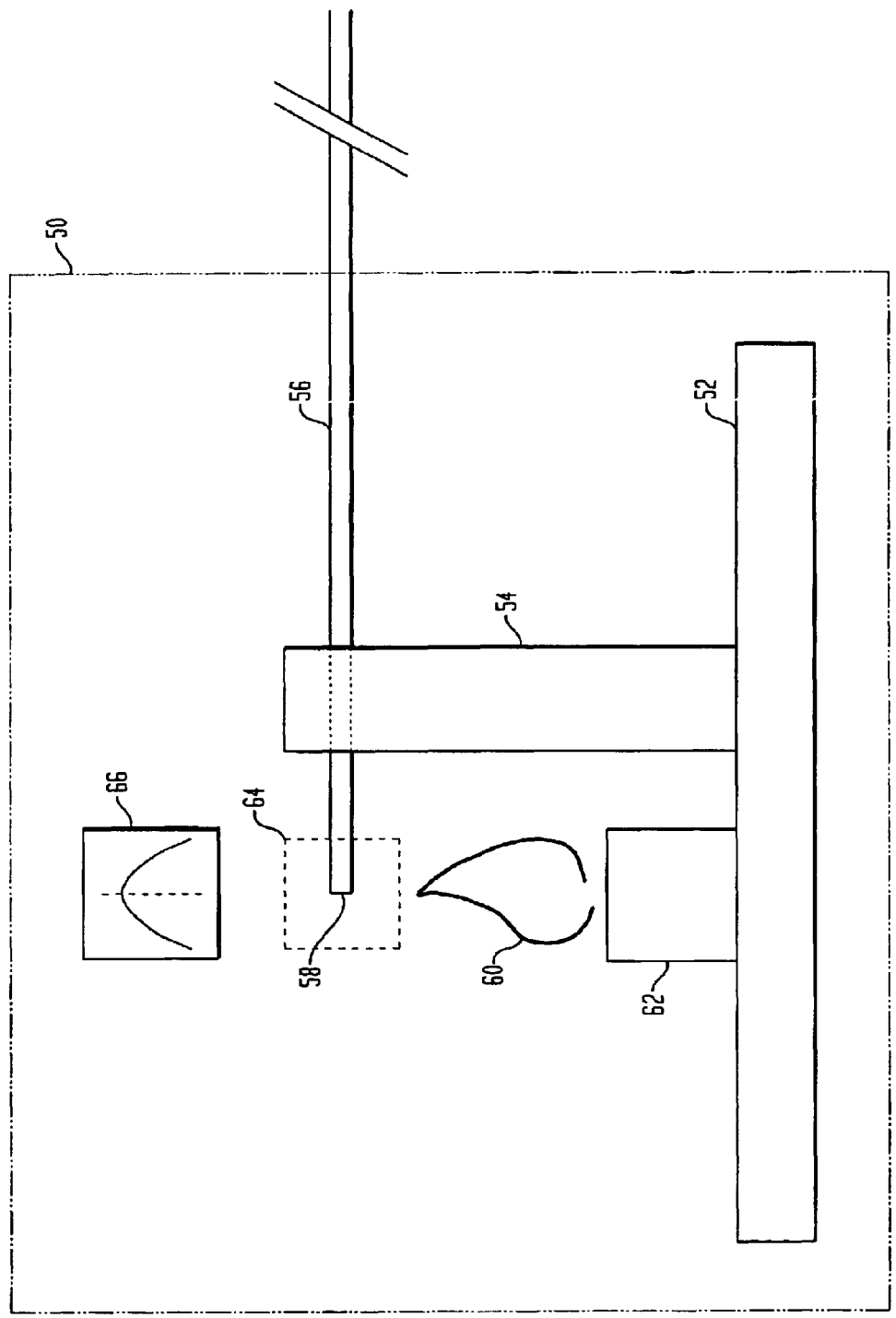
FIG. 4 shows a diagram of a pre-splice heat treatment station according to the prior art.

Heat may be applied to expand a fiber's modefield in a pre-splice thermal treatment. FIG. 4 shows a diagram of a pre-splice thermal treatment station 50. The station includes a base 52 onto which is mounted a fiber holding clamp 54. The fiber holding clamp 54 holds an optical fiber 56 that is to be thermally treated. The clamp 54 holds the fiber 56 such that a length of the fiber's lead end 58 is positioned over a heating source 60. In the present example, the heating source 60 is the flame from a methanol burner 62 mounted to the base 52. The heat source 60 forms a heat zone 64 around the fiber end 58. A heating profile 66 for the heat zone 64 is shown at the top of FIG. 4. The heat profile 66 shows temperature as a function of position. The peak of the heating profile 66 corresponds to the peak of the flame 60.

Figure 5:
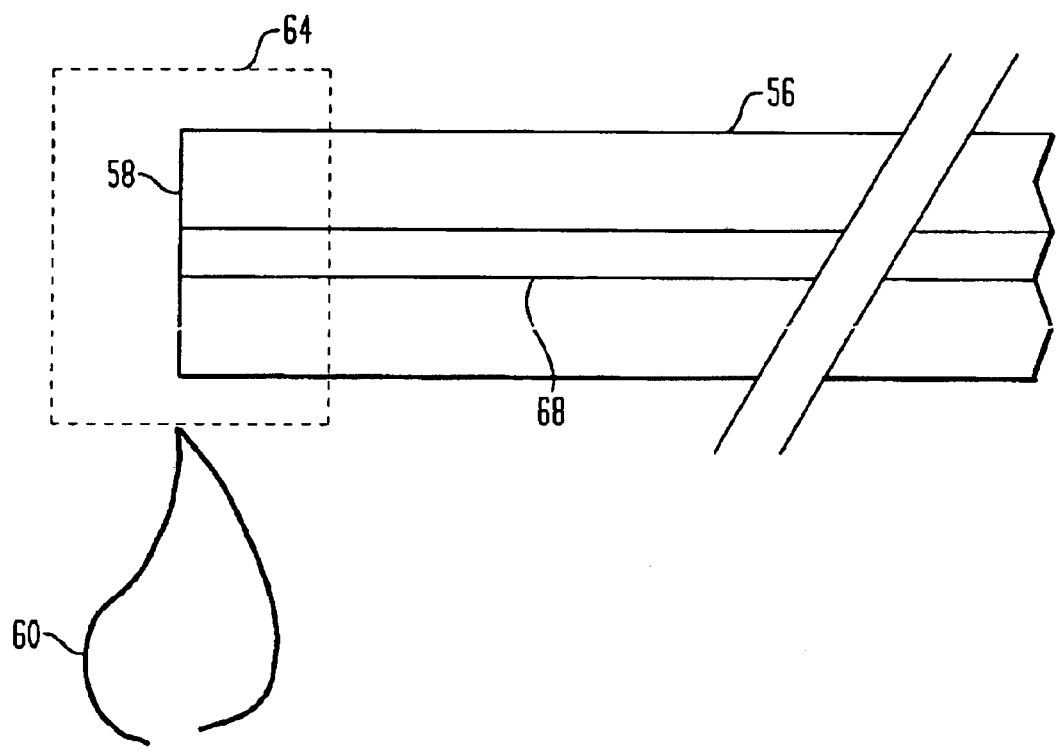
FIG. 5 shows a diagram of a pre-splice heat treatment being applied to a lead end of an optical fiber.
Figure 6:
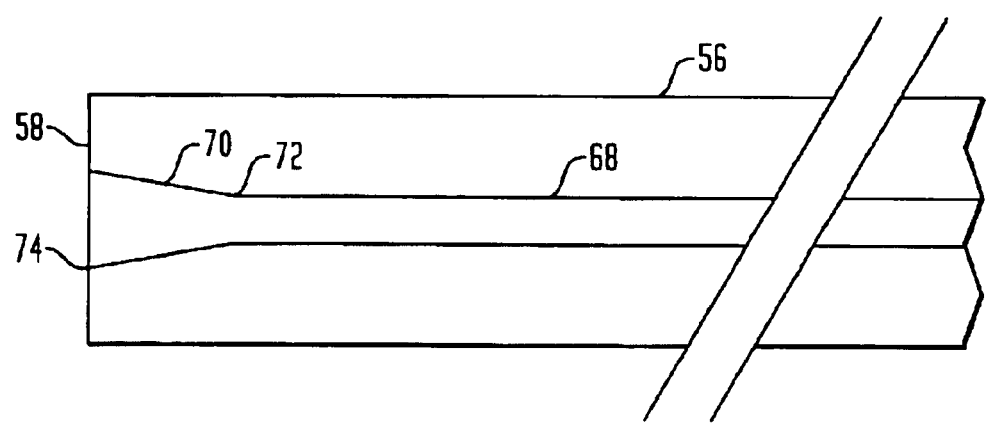
FIG. 6 shows a diagram of the optical fiber shown in FIG. 5 after the pre-splice heat treatment has been completed.

FIG. 5 shows a closeup diagram of the fiber 56 as it is being heated by the flame 60. As shown in FIG. 5, at the start of the pre-splice heat treatment, the fiber 56 has a relatively narrow modefield 68 having a constant diameter down the length of the fiber 56. FIG. 6 shows a diagram of the fiber 56 after the pre-splice treatment has been completed. As shown in FIG. 6, the fiber modefield 56 now includes a portion 70 that has been thermally expanded into a tapered shape. The tapered portion 70 forms an internal bridge, having a narrower diameter at a first end 72 that makes a smooth, tapered transition to a wider diameter at a second end 74. The narrower diameter end 72 matches the diameter of the unexpanded modefield 68. The wider diameter end 74 matches the modefield diameter of a second fiber to which the first fiber 56 is to be spliced.

Figure 7:
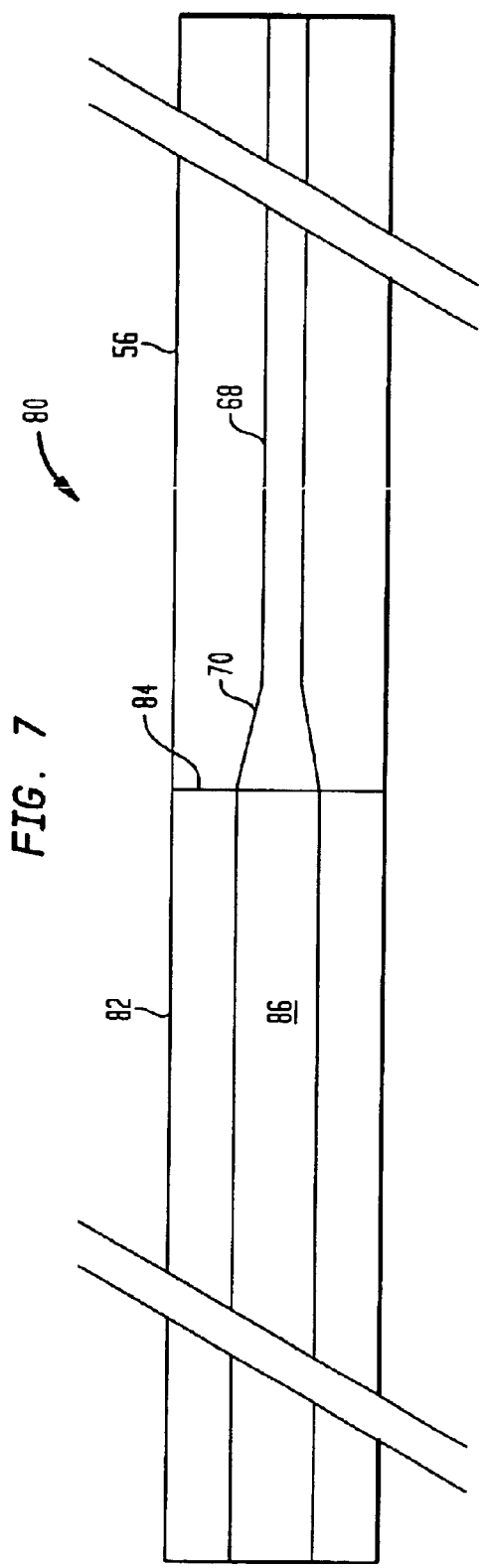
FIG. 7 shows an optical fiber transmission line fabricated using the thermally treated fiber shown in FIG. 6.

FIG. 7 shows a diagram of an optical line 80 fabricated from the thermally treated fiber shown in FIG. 6 and from a second fiber 82 that have been spliced together at a splice point 84. The second fiber 82 has a modefield 86 that has a larger diameter than the first fiber modefield 68. As shown in FIG. 7, there is no longer a modefield diameter mismatch at the splice point 84. Thus, there is significantly less splice loss in the splice combination shown in FIG. 7, compared with the splice combination shown in FIG. 3.

However, it has been found that it is difficult to achieve consistent loss reduction results with the pre-splice thermal treatment station 50 shown in FIG. 4. It has been theorized that one reason for this difficulty is that the internal bridge formed using the pre-splice thermal treatment station 50 is relatively short, having a length on the order of 1 mm. A beam propagation method (BPM) was used to calculate expected splice losses resulting from the use of a bridge of this length. The results of the BPM calculations are set forth in graph 100 shown in FIG. 8.

The graph 100 shows predicted splice loss as a function of fiber length. Fiber length is expressed in microns along the x-axis, which is scaled logarithmically. Splice loss is expressed in decibels (dB) along the y-axis. The upper trace 102 shows predicted splice loss at an optical signal wavelength of 1550 nm. The lower trace 104 shows predicted splice loss at an optical signal wavelength of 1625 nm.

Figure 8:
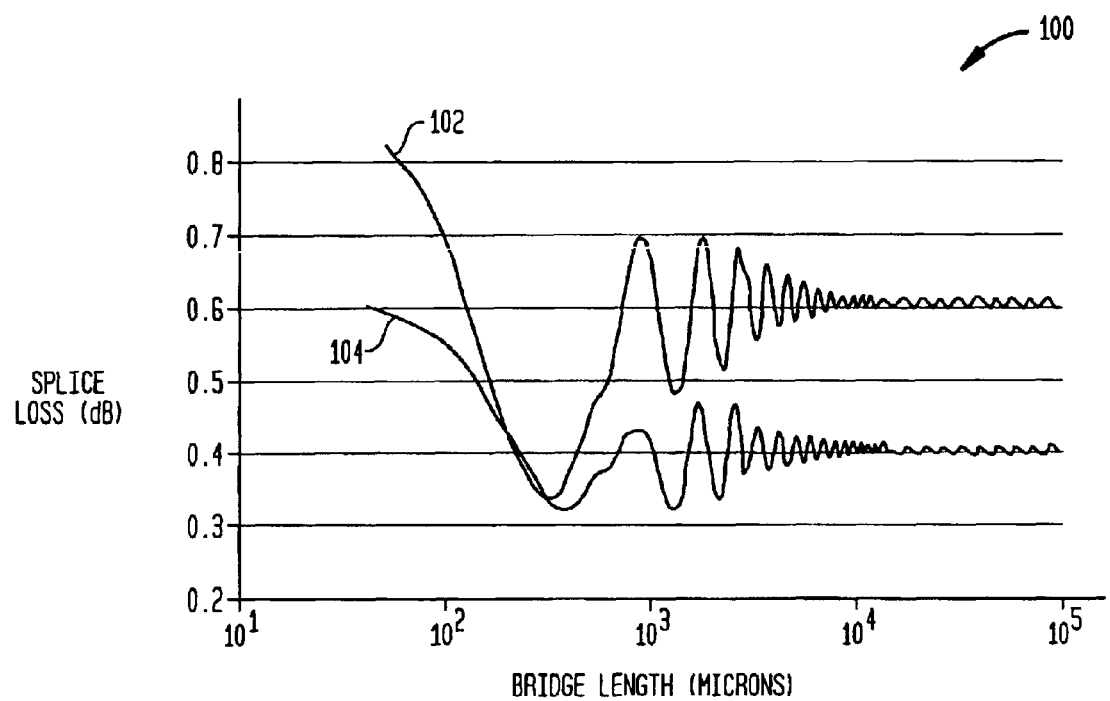
FIG. 8 shows a graph illustrating the relationship between internal bridge length and splice loss, as calculated using a beam propagation method (BPM).

As shown in FIG. 8, splice loss reduction is relatively stable at internal bridge lengths of greater than 10,000 microns (10 mm). As the internal bridge length decreases below 10 mm, the amount of splice loss reduction becomes increasingly length dependent. Thus, at internal bridge lengths on the order of 1 mm, even the difference of a few microns may result in a significantly different amount of loss reduction.

Splice loss reduction is further affected by the types of dopants used in the fiber being thermally treated. For example, certain premium fibers, such as Inverse Dispersion Fiber, are heavily doped with fluorine, which diffuses rapidly when subjected to the pre-splice heat treatment. In addition, these premium fibers are doped to have a steep dispersion slope. Because of this steep slope, even relatively minor changes in the fiber's refractive index profile may have a significant impact on the fiber's optical properties Thus, these premium fibers tend to be highly sensitive to thermal treatment. Slight variations in the thermal treatment may result in perturbations in the modefield, resulting in varying amounts of mode coupling, leading to varying amounts of splice loss.

It should be noted that the amount of splice loss reduction may vary between treated fibers even where the expanded modefield diameter at the splice point is the same. It has been discovered that one possible cause of this variation in splice loss reduction is variation in the length of the region of fiber that is thermally treated in the pre-splice heat treatment station.

FIGS. 9A and 9B show diagrams illustrating the application of a pre-splice heat treatment to different lengths of the lead end of a sample fiber 110 and 110', and FIGS. 10A and 10B show diagrams illustrating the modefield expansion 122 and 122' that results from the different treated lengths shown in FIGS. 9A and 9B.

In FIG. 9A, the fiber 110 is loaded into a pre-splice heat treatment station. The fiber end 112 is positioned relative to the station's heat source 114 and heating zone 116 so that splice loss is minimized. FIG. 10A shows that, as a result of the pre-splice treatment, the modefield 120 has undergone a tapered expansion from a first diameter $D_0$ to an expanded diameter $D_1$ at the fiber's lead end 112.

FIG. 9B shows a second fiber sample 110' that has loaded into the pre-splice heat treatment station. In FIG. 9B, the fiber end 112' has been moved towards the right in the heating zone 116 (relative to the position of the fiber end 112 in FIG. 9A), thus decreasing the length of the fiber end 112' that is positioned over the heat source 114. FIG. 10B shows that, as a result of the pre-splice treatment, the modefield 120' has again undergone a tapered expansion from a first diameter $D_0$ to an expanded diameter $D_1$ at the fiber's lead end 112'. However, as shown in FIG. 10B, the change in position of the fiber end 112' has caused the expanded portion 122' of the modefield 120' to have a different shape. For convenient comparison, the expanded modefield 122 shown in FIG. 10A is shown in FIG. 10B using broken lines.

As discussed above, because a premium fiber, such as Inverse Dispersion Fiber, has a relatively high concentration of fluorine dopant and a steep dispersion slope, even a relatively slight perturbation in the expanded portion of the modefield can result in significant splice loss. Thus, even though the fibers 110 and 110' shown in FIGS. 10A and 10B have transition regions 122 and 122' with the same diameter at the lead end 112 and 112', a significant amount of splice loss can nonetheless result.

According to the present invention, consistency of splice loss reduction is accomplished by precisely controlling the length of the fiber lead end that is exposed to the heat source in a pre-splice heat treatment station. In one exemplary embodiment of the invention, a translation stage is used to control the length of optical fiber that is exposed to the heat source.

Figure 11:
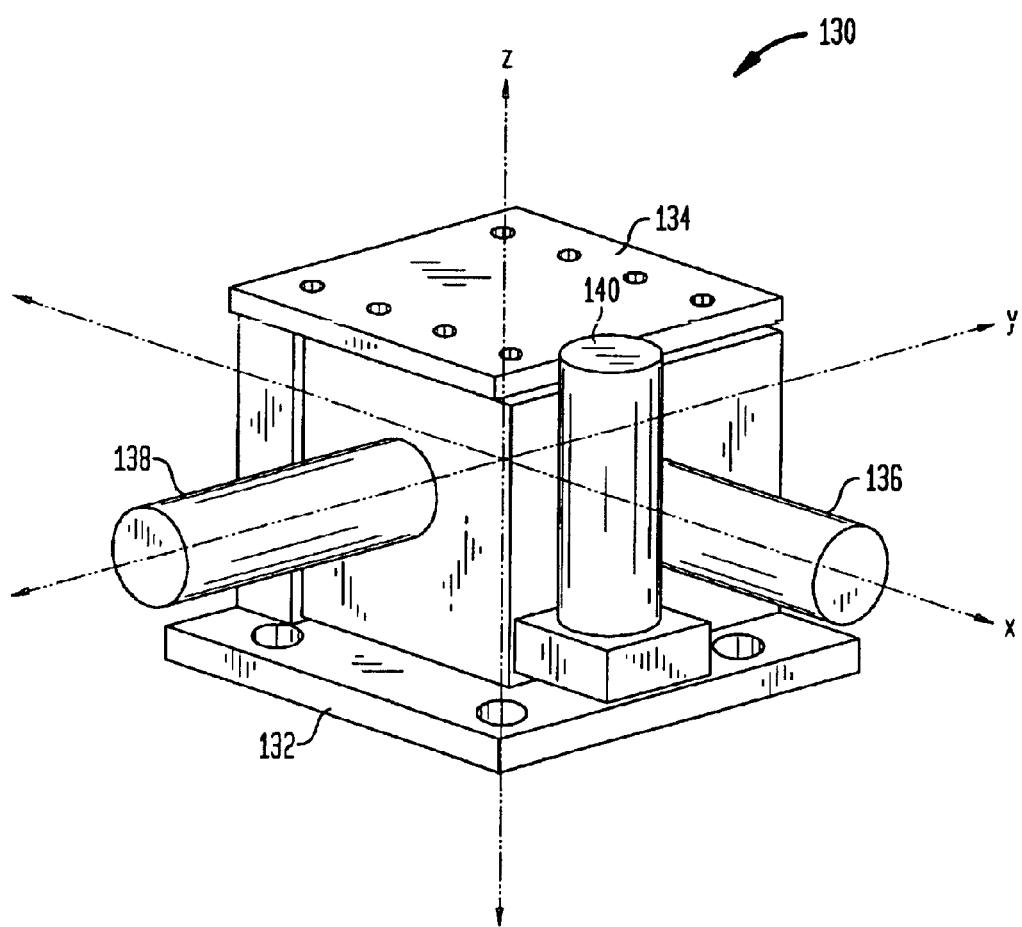
FIG. 11 shows a perspective view of a translation stage for use in a pre-splice heat treatment station according to an aspect of the invention.

FIG. 11 shows a perspective view of a translation stage 130 suitable for use in the present invention. The translation stage 130 includes a bottom mount 132 for attaching the translation stage 130 to the pre-splice treatment station, and a top mounting plate 134 for holding a component to be positioned by the translation stage 130. The top mounting plate 134 is selectively advanced linearly along each of the x-, y-, and z-axes using the respective control knobs 136, 138 and 140. If desired, the control knobs can be equipped with piezoelectric actuators, allowing the translation stage 130 to be operated electronically, for example by a microprocessor controller. The translation stage 130 is calibrated along each axis to allow the position of the top mount 134 to be precisely reproduced and adjusted.

Figure 12:
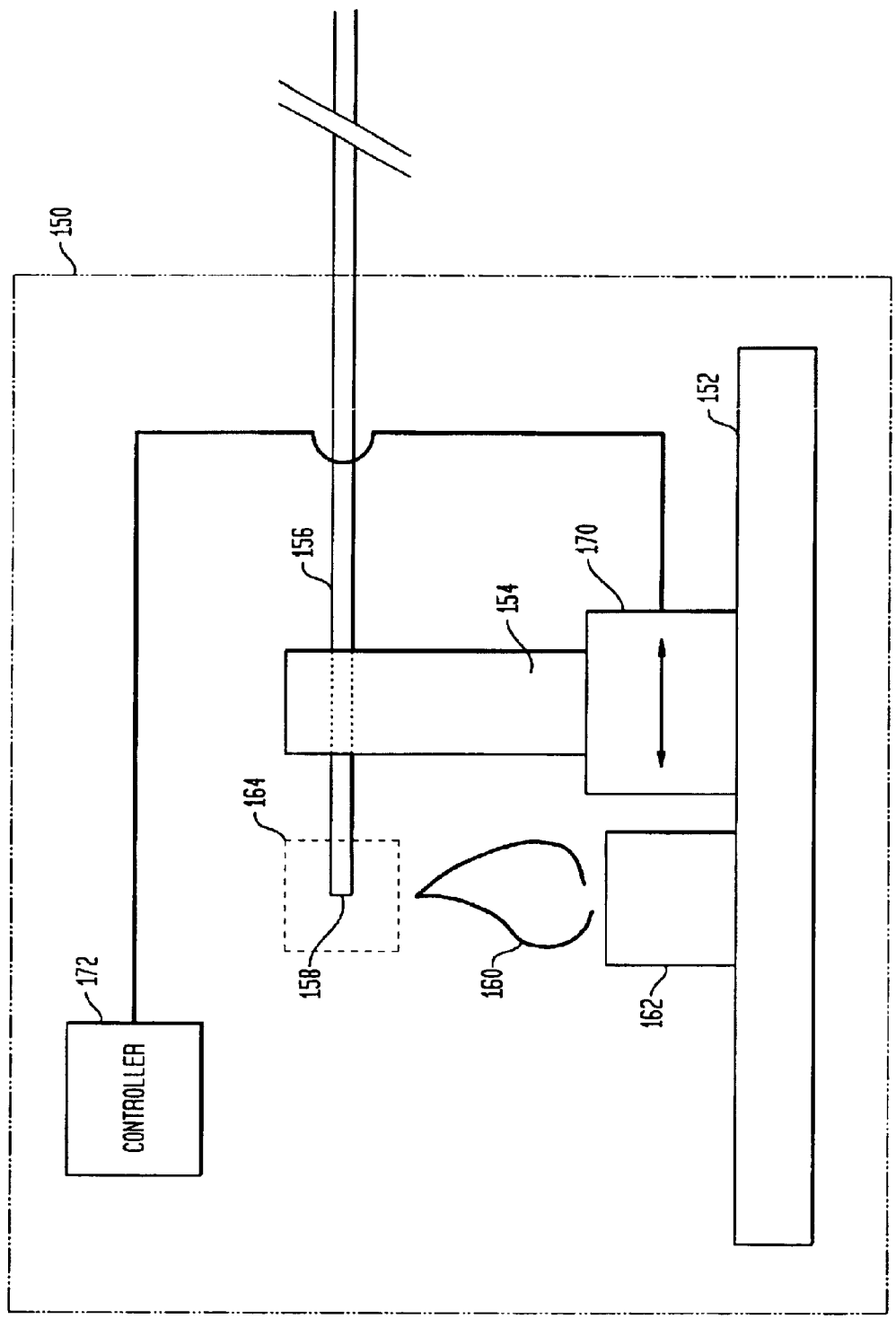
FIGS. 12–14 are a series of diagrams illustrating exemplary embodiments of pre-splice heat treatment stations according to various aspects of the invention.

FIG. 12 shows a diagram of a pre-splice heat treatment station 150 according to an aspect of the present invention. The station 150 includes a base 152, to which is mounted a translation stage 170 such as the translation stage 130 shown in FIG. 11, or other suitable length adjustment means. Mounted to the top of the translation stage 130 is a fiber holding clamp 154 for holding an optical fiber 156 to be thermally treated.

The fiber holding clamp 154 holds the fiber 156 such that the fiber end 158 is positioned over a heat source 160. In this exemplary embodiment, the heat source 160 is the flame from a methanol burner 162. The flame forms a heating zone 158 that applies a controlled heat to the fiber end 158. The position of the fiber end 158 in the heating zone 158 is precisely controlled by the translation stage 170. A controller 172 unit controls the translation stage 170. Alternatively, the translation stage may be controlled manually.

The translation stage 170 is mounted onto the base 52 such that actuation of the translation stage along any of its axes produces a corresponding linear translation of the position of the fiber end 158 relative to the heat source 160. In particular, in this embodiment, the translation stage 170 is mounted such that actuation of the translation stage 170 along its x-axis causes a movement of the fiber end 158 along the longitudinal axis of the fiber 156. Actuation of the translation stage 170 along its z-axis causes a movement of the fiber end 158 up and down in a direction that is perpendicular to the longitudinal axis of the fiber 156. Finally, actuation of the translation stage 170 along its y-axis causes a movement of the fiber end 158 side to side in a direction that is perpendicular to the longitudinal axis of the fiber 156. It should be noted that the designation of each direction of movement as along the x-axis, y-axis, and z-axis may be interchanged without departing from the spirit of the invention.

It is contemplated that adjustment of the position of the fiber end 158 along the x-axis will be particularly useful. It will be seen that adjusting of the position of the fiber end 158 along this axis will cause an adjustment of the length of the fiber end 158 that is exposed to the heat source 160.

Figure 13:
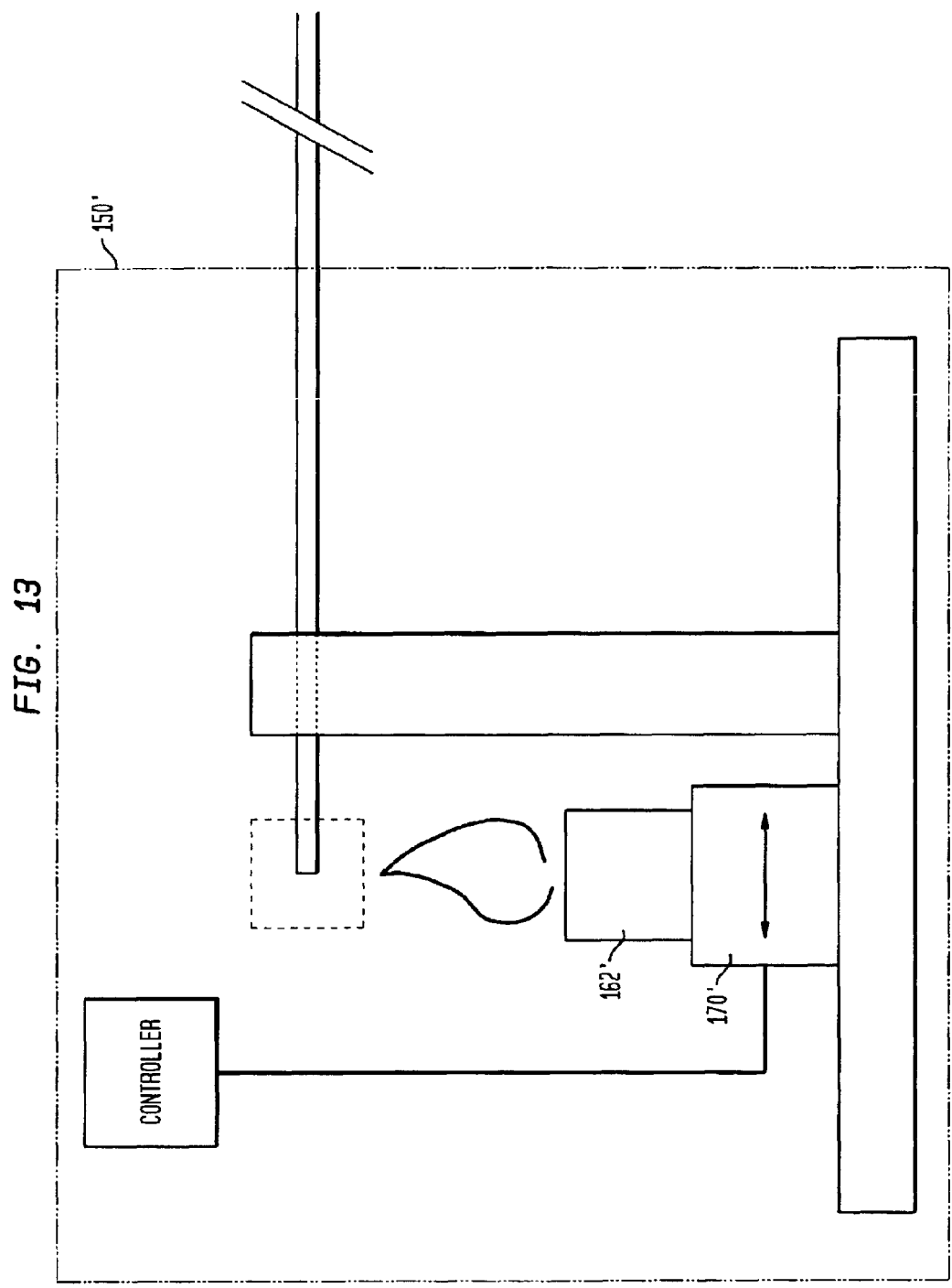
Figure 14:
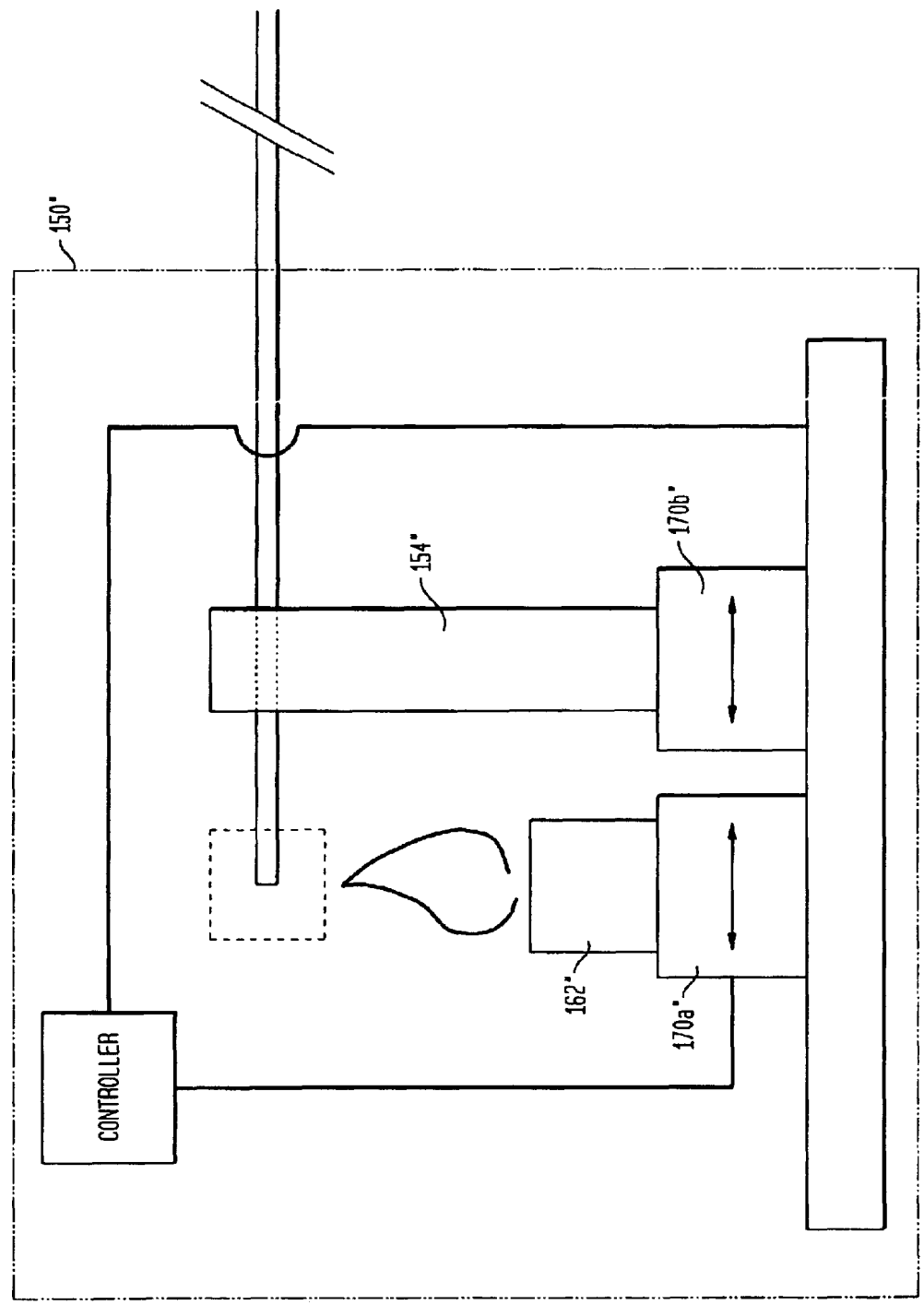

FIGS. 13 and 14 show alternative exemplary embodiments of a pre-splice heat treatment station 150' and 150" according to the present invention. In the station 150' shown in FIG. 13, a translation stage 170', or other suitable length adjustment means, is used to control the position of the methanol burner 162'. In the station 150" shown in FIG. 14, a pair of translation stations 170a" and 170b", or other suitable length adjustment means, are used to control the positions of both the methanol burner 162" and the fiber holding clamp 154".

Figure 15:
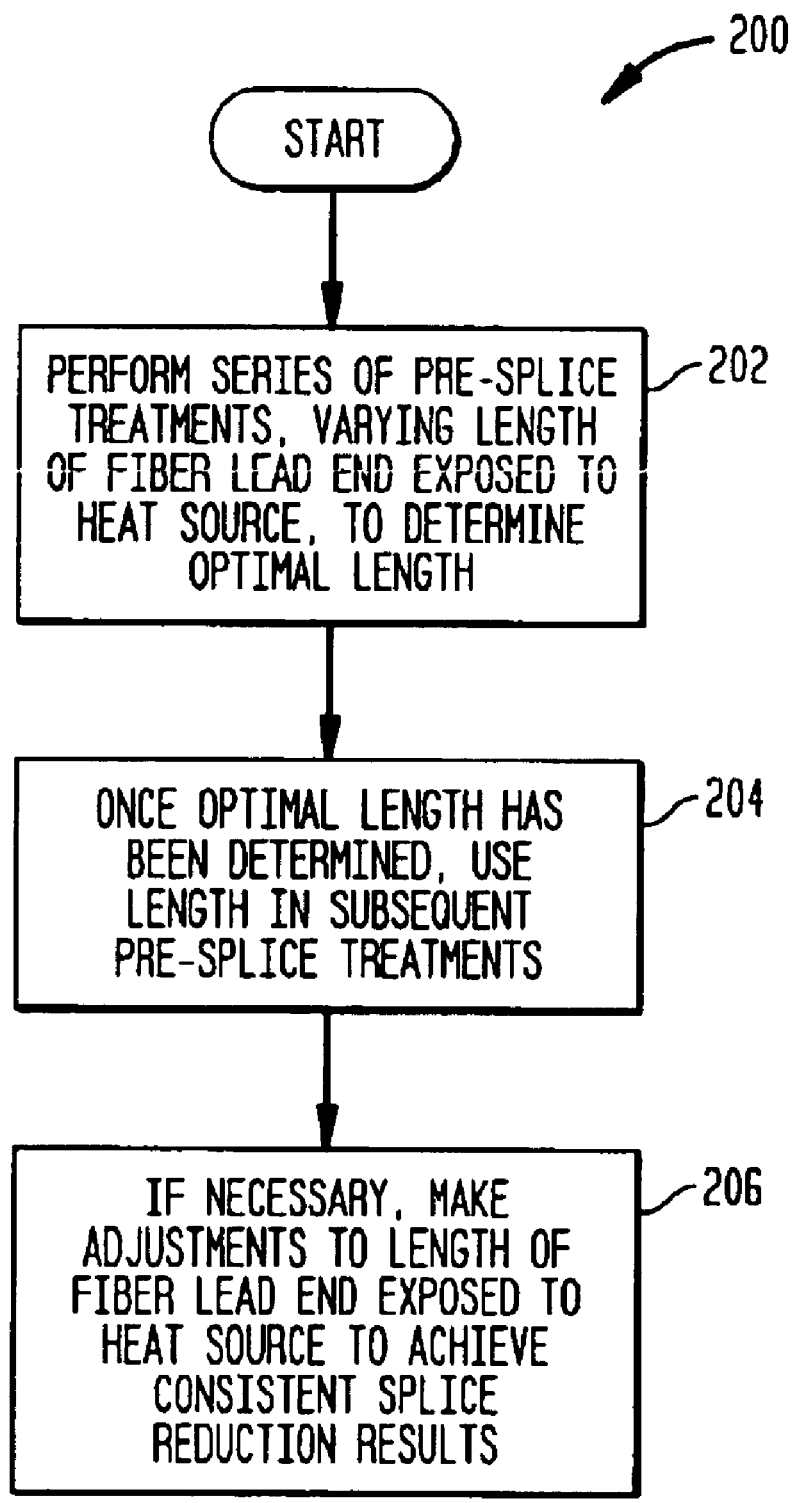
FIG. 15 shows a flowchart of a method according to a further aspect of the invention for applying a pre-splice heat treatment to an optical fiber.

FIG. 15 shows a flowchart of a method 200 according to the present invention. In this method, it is assumed that a number of splices are to be performed between a first type of fiber having a narrower modefield diameter and a second type of fiber having a larger modefield diameter, and that it is desired to use a pre-splice thermal treatment station to achieve a consistent reduction in splice loss. As described above, the pre-splice heat treatment is applied to the first fiber to cause a thermal expansion its modefield to reduce modefield mismatch when the first and second fibers are spliced together.

In step 202, a series of trials are performed to determine an optimal length of the first fiber lead end to be exposed to the heat source in the thermal treatment station. In the series of trials, samples of the first fiber are subjected to a pre-splice thermal treatment and then spliced to samples of the second fiber. In the series of trials, the length of the first fiber lead end exposed to the heat source is varied, and the resulting splice loss is measured. From these series of trials, an optimal length of the first fiber lead end to be exposed to the heat source is determined. In step 204, once an optimal length has been determined, it is used in subsequent splices. In step 206, if necessary, adjustments are made to the length of the fiber end exposed to the heat source in order to achieve consistent splice reduction results.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A heat treatment station for applying a pre-splice heat treatment to a lead end of a first optical fiber having a first modefield diameter, comprising:

a base;

a fiber clamp for holding the first optical fiber such that a length of the lead end of the first optical fiber is positioned over a heat source mounted to the base, the heat source causing a controlled expansion of the first fiber modefield at the first fiber lead end to form an internal bridge; and length adjustment means for selectably adjusting the length of the first fiber lead end positioned over the heat source.

2. The heat treatment station of claim 1, wherein the internal bridge decreases modefield mismatch when the first fiber lead end is spliced to a lead end of a second fiber having a second modefield diameter that is larger than the first fiber modefield diameter.

3. The heat treatment station of claim 1, wherein adjusting the length of the first fiber lead end positioned over the heat source causes an adjustment in the length of the internal bridge.

4. The heat treatment station of claim 1, wherein the length adjustment means comprises a translation stage.

5. The heat treatment station of claim 4, wherein the translation stage includes a bottom mount that is mounted to the base and a top mounting plate to which the fiber clamp is mounted.

6. The heat treatment station of claim 5, wherein the translation stage causes translational movement of the first fiber lead end along its longitudinal axis.

7. The heat treatment station of claim 6, wherein the translation stage further causes translational movement of the first fiber lead end in an up-and-down direction.

8. The heat treatment station of claim 6, wherein the translation stage further causes translational movement of the first fiber lead end in a side-to-side direction.

9. The heat treatment station of claim 4, wherein the translation stage is controlled by a controller unit.

10. The heat treatment station of claim 4, wherein the translation stage comprises a bottom mount that is mounted to the base and a top mounting plate to which the heat source is mounted.

11. The heat treatment station of claim 1, wherein the length adjustment means comprises a first translation stage to which the fiber holding clamp is mounted and a second translation stage to which the heat source is mounted.

12. A method for thermally treating a first optical fiber having a first modefield diameter, comprising:
(a) loading a lead end of a sample of the first fiber into a heat treatment station;
(b) applying heat to a length of the lead end to form an internal bridge;
(c) splicing the lead end of the sample first fiber to a lead end of a sample second fiber and measuring resulting splice loss;
(d) repeating steps (a) through (c) with additional samples of the first fiber while varying the length of the lead end to which the heat is applied;
(e) determining an optimal length of the first fiber lead end to which heat is to be applied; and
(f) using the length determined in step (e) in subsequent heat treatments.

13. The method of claim 12, wherein step (b) includes applying heat to the first fiber lead end to cause a controlled, tapered expansion of the modefield in the first fiber lead end.

14. The method of claim 13, wherein the modefield in the first fiber lead end is expanded to match the second fiber modefield.

15. The method of claim 12, wherein step (f) further includes:
monitoring subsequent splices and adjusting the length of the first fiber lead end to which heat is applied to maintain a consistent level of splice loss reduction.

* * * * *